United States Patent
Sugimoto et al.

(10) Patent No.: US 12,480,227 B2
(45) Date of Patent: Nov. 25, 2025

(54) ELECTROSPINNING APPARATUS AND ELECTROSPINNING METHOD

(71) Applicant: KABUSHIKI KAISHA TOSHIBA, Tokyo (JP)

(72) Inventors: Kanta Sugimoto, Kanagawa (JP); Kenichi Ooshiro, Kanagawa (JP); Yoko Tokuno, Kanagawa (JP); Kenya Uchida, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 118 days.

(21) Appl. No.: 18/462,649

(22) Filed: Sep. 7, 2023

(65) Prior Publication Data
US 2024/0110313 A1    Apr. 4, 2024

(30) Foreign Application Priority Data
Oct. 3, 2022  (JP) .................. 2022-159497

(51) Int. Cl.
*B29C 48/92*   (2019.01)
*D01D 4/02*    (2006.01)
(Continued)

(52) U.S. Cl.
CPC ......... *D01D 5/0069* (2013.01); *D01D 5/0038* (2013.01); *D01D 5/0061* (2013.01);
(Continued)

(58) Field of Classification Search
CPC .......... B29C 48/92; B29C 2948/92228; D01D 4/02; D01D 5/0038; D01D 5/0061; D01D 5/0076; G01N 2291/022
USPC ....... 264/40.1, 85, 211.13, 211.14, 464, 465, 264/466, 484; 425/135, 174.8 E, 377, 425/382.2, 464; 73/19.1
See application file for complete search history.

(56) References Cited

U.S. PATENT DOCUMENTS

| | | |
|---|---|---|
| 10,501,868 B2 | 12/2019 | Kodama |
| 2015/0275399 A1 | 10/2015 | Kodama |

(Continued)

FOREIGN PATENT DOCUMENTS

| | | | | |
|---|---|---|---|---|
| CN | 104480639 A | * | 4/2015 | ........... D01D 5/0076 |
| CN | 104781460 A | | 7/2015 | |

(Continued)

OTHER PUBLICATIONS

Translation of CN 104480639 A (published on Apr. 1, 2015).*
Office Action issued on Aug. 26, 2025, in corresponding Chinese Patent Application No. 202310773166.6, 15 pages.

*Primary Examiner* — Leo B Tentoni
(74) *Attorney, Agent, or Firm* — Maier & Maier, PLLC

(57) ABSTRACT

In an embodiment, an electrospinning apparatus includes a transfer unit, a spinning head and an air ejection unit. In the transfer unit, a transfer target is transferred along a transfer direction, and a spinning head is capable of ejecting a material liquid toward the transfer unit from a first direction, which intersects the transfer direction. The air ejection unit forms an air flow that flows across the transfer unit toward an area located on an opposite side across the transfer unit in a second direction, which intersects both the transfer direction and the first direction, by ejecting air against the transfer unit from one side of the second direction.

4 Claims, 6 Drawing Sheets

(51) Int. Cl.
    *D01D 5/00*        (2006.01)
    *D01D 7/00*        (2006.01)
(52) U.S. Cl.
    CPC .. *D01D 5/0076* (2013.01); *B29C 2948/92228* (2019.02); *G01N 2291/022* (2013.01)

(56)             References Cited

U.S. PATENT DOCUMENTS

2017/0268129 A1    9/2017  Uchida et al.
2021/0079573 A1    3/2021  Makino et al.

FOREIGN PATENT DOCUMENTS

| CN | 107429429 A | 12/2017 |
| CN | 109790646 A | 5/2019 |
| CN | 109996909 A | 7/2019 |
| JP | H0544104 A | 2/1993 |
| JP | 2005154999 A | 6/2005 |
| JP | 2012207351 A | 10/2012 |
| JP | 2014047440 A | 3/2014 |
| JP | 5719421 B2 | 5/2015 |
| JP | 5754703 B2 | 7/2015 |
| JP | 6649514 B2 | 2/2020 |

\* cited by examiner

ELECTROSPINNING APPARATUS AND ELECTROSPINNING METHOD

CROSS-REFERENCE TO RELATED APPLICATIONS

This application is based upon and claims the benefit of priority from Japanese Patent Application No. 2022-159497, filed Oct. 3, 2022; the entire contents of which are incorporated herein by reference.

FIELD

Embodiments described herein relate to an electrospinning apparatus and an electrospinning method.

BACKGROUND

An electrospinning apparatus that forms a fiber film with an electrospinning method (sometimes called an "electric charge induction spinning method") is known. To form a fiber film using such an electrospinning apparatus, a material liquid is ejected via an electrospinning method against a transfer target, which is transferred in a transfer unit, from the nozzles of one or more spinning heads. Fiber of a high polymer material contained in the material liquid is thus accumulated on the surface of the transfer target, and a fiber film is formed thereon.

If a fiber film is formed via a spinning method as described above, it is required that a vapor concentration of a solvent contained in the material liquid, in an area in which the material liquid is ejected from a spinning head, be lowered. For this reason, it is required that a vapor concentration of a solvent in an area in which the material liquid is ejected from spinning heads be lowered by appropriate ventilation of this area.

DETAILED DESCRIPTION

According to an embodiment, an electrospinning apparatus includes a transfer unit, a spinning head, and an air ejection unit. In the transfer unit, a transfer target is transferred along a transfer direction, and a spinning head is capable of ejecting a material liquid toward the transfer unit from a first direction, which intersects the transfer direction in the transfer unit. The air ejection unit forms an air flow that flows across the transfer unit toward an area located on the opposite side across the transfer unit in a second direction, which intersects both the transfer direction and the first direction, by ejecting air against the transfer unit from one side of the second direction.

Hereinafter, the embodiments will be described with reference to the accompanying drawings.

First Embodiment

Figure 1:
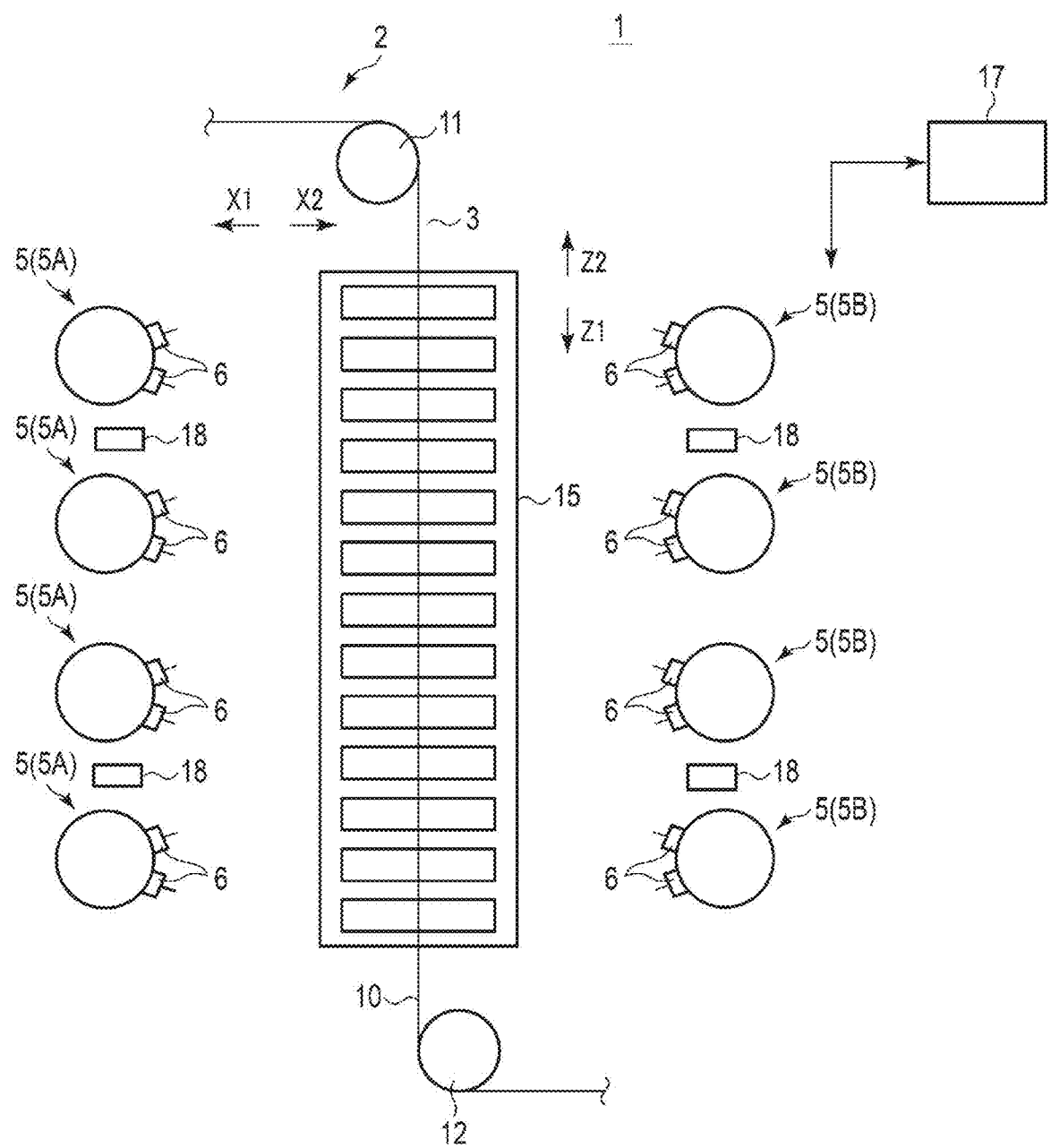
FIG. 1 is a schematic diagram showing an electrospinning apparatus of a first embodiment, when a transfer unit, etc. are viewed from one side of a second direction.
Figure 2:
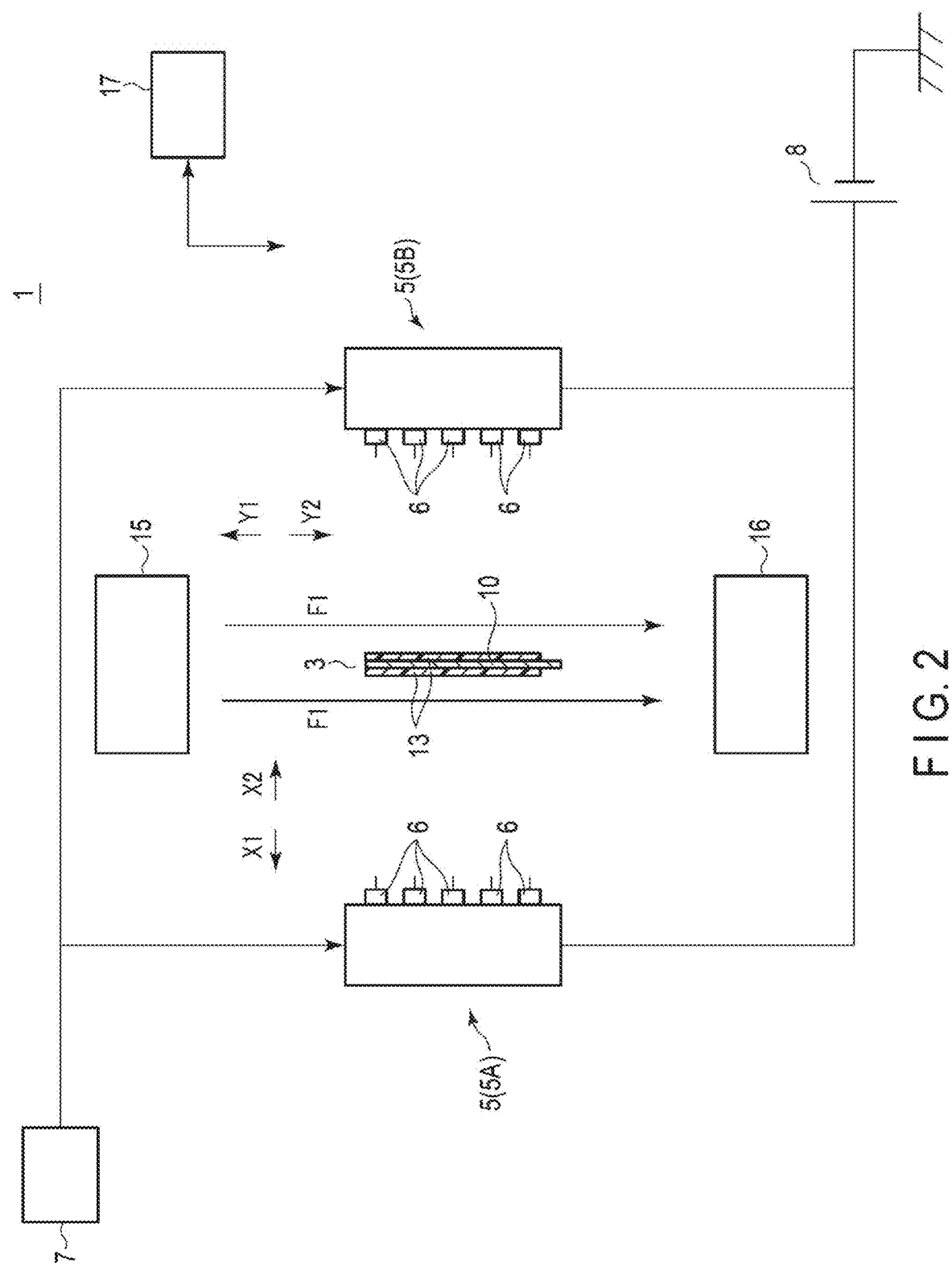
FIG. 2 is a schematic diagram showing the electrospinning apparatus of the first embodiment, when the transfer unit, etc. are viewed from an upper stream side of the transfer unit.
Figure 3:
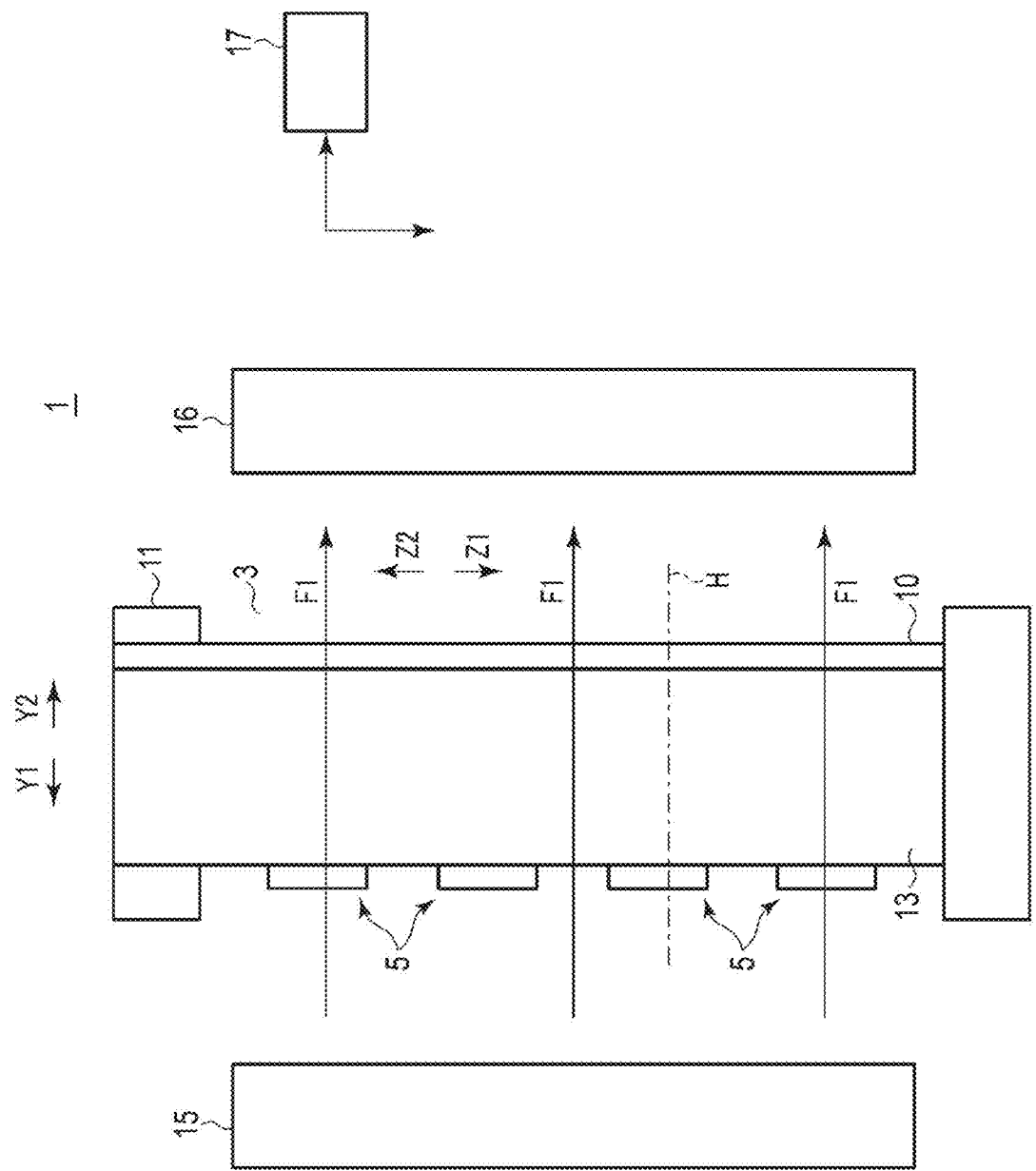
FIG. 3 is a schematic diagram showing the electrospinning apparatus of the first embodiment, when the transfer unit, etc. are viewed from one side of a first direction.

FIGS. 1, 2 and 3 show an example of an electrospinning apparatus 1 according to the first embodiment. As shown in FIGS. 1 to 3, a transfer path 2 for transferring a transfer target 10 is formed in the electrospinning apparatus 1. The transfer path 2 extends from a sender (not shown) to a winder (not shown), and a transfer target 10 is transferred from the sender to the winder in, for example, a role-to-role manner. As the transfer target 10, a substrate or a collecting body is transferred. In the example shown in FIGS. 1 to 3, guide rollers 11 and 12 are arranged in the transfer path 2, and a transfer unit 3 is formed between the guide rollers 11 and 12 as a part of the transfer path 2.

In the transfer unit 3, a transfer target 10 is transferred from the guide roller 11 toward the guide roller 12, and the direction from the guide roller 11 toward the guide roller 12 is defined as a "transfer direction" (the direction indicated by arrow Z1). In the transfer unit 3, the side toward the guide roller 12 is defined as a "downstream side", and the side toward the guide roller 11 (the arrow Z2 side) is defined as an "upstream side". In the transfer unit 3, the first direction intersecting the transfer direction (the direction indicated by arrow X1 and arrow X2) and the second direction intersecting both the transfer direction and the first direction (the direction indicated by arrow Y1 and arrow Y2) are defined. The first direction may also be called a "depth direction of the transfer unit 3", and the second direction may also be called a "width direction of the transfer unit 3". FIG. 1 shows the transfer unit 3, etc. viewed from one side of the second direction, and FIG. 2 shows the transfer unit 3, etc. viewed from the upper stream side of the transfer unit 3. FIG. 3 shows the transfer unit 3, etc. viewed from one side of the first direction.

In the example shown in FIGS. 1 to 3, the first direction is orthogonal (or approximately orthogonal) to the transfer direction in the transfer unit 3, and the second direction is orthogonal (or approximately orthogonal) to the transfer direction and the first direction. In the example shown in FIGS. 1 to 3, the transfer direction of the transfer unit 3 is parallel (or approximately parallel) to the vertical direction, and a transfer target is transferred toward the lower side of the vertical direction in the transfer unit 3. Each of the first direction and the second direction is parallel (or approximately parallel) to the horizontal plane. The transfer direction in the transfer unit 3 is not particularly limited. In one example, in the transfer unit 3, a transfer target 10 is transferred toward the upper side of the vertical direction. In another example, the transfer direction of the transfer unit 3 is parallel, or approximately parallel, to the horizontal direction (horizontal plane). In yet another example, the transfer direction of the transfer unit 3 is tilted with respect to both the vertical direction and the horizontal direction.

In the electrospinning apparatus 1, one or more spinning heads 5 are provided for the transfer unit 3. In the example of FIGS. 1 to 3, eight spinning heads 5 are provided for the transfer unit 3. Four of the eight spinning heads 5, to be referred to as "spinning heads 5A", are arranged on one side of the first direction (the width direction of the transfer unit 3) with respect to the transfer unit 3, and the other four spinning heads 5, to be referred to as "spinning heads 5B", are arranged on the other side of the spinning heads 5A, with respect to the transfer unit 3. In the example of FIGS. 1 to 3, four spinning heads 5A are arranged side by side along the transfer direction in the transfer unit 3 in the area located on one side of the first direction with respect to the transfer unit 3. Four spinning heads 5B are arranged side by side in the transfer direction in the transfer unit 3 in the area opposite to the spinning heads 5A with respect to the transfer unit 3 in the first direction. The number of spinning heads 5 provided in the transfer unit 3 is not limited to a particular number, as long as it is one or greater.

Each of the spinning heads 5 has one or more nozzles 6, and in the example of FIGS. 1 to 3, a plurality of nozzles 6 are provided in each of the spinning heads 5. In each spinning head 5, each of the nozzles 6 projects on the outer peripheral surface toward the outer peripheral side. In each of the spinning heads 5, each nozzle 6 projects in the first direction toward a side on which the transfer unit 3 is located. Each spinning head 5 is capable of ejecting a material liquid from each nozzle 6 toward the transfer unit 3, and of ejecting a material liquid against a transfer target 10 transferred in the transfer unit 3. The number of nozzles 6 provided in the spinning head 5 suffices as long as it is one or more. The shape of the nozzles 6 is also not limited.

As shown in FIG. 2, etc., the electrospinning apparatus 1 includes a material liquid supply unit 7 and an electric power supply 8. The material liquid supply unit 7 constitutes a supply source of a material liquid and a supply path for a material liquid from the supply source to each spinning head 5. In one example, a material liquid stored in a tank, etc. is supplied to each spinning head 5 by the driving of a driving member such as a pump, etc. in the supply unit 7. The supply unit 7 may be provided either with a control valve capable of controlling a flow amount and a pressure, etc. of a material liquid supplied to each spinning head 5 or with a switch valve capable of switching between on and off for supplying a material liquid to each spinning head 5.

A material liquid is a solution of a high polymer material dissolved in a solvent. For this reason, when a material liquid is ejected from each of the spinning heads 5 toward a transfer target 10, fiber made of a high polymer contained in the material liquid is accumulated on the surface of the transfer target 10, and a fiber film 13 is thereby formed on the surface of a transfer target. In one example, a collecting body is transferred as a transfer target 10, and a fiber film 13 is formed on the surface of the collecting body. The fiber film 13 can be obtained as a product by removing the fiber film 13 from the collecting body. In another example, a substrate is transferred as a transfer target 10 and a fiber film 13 is formed on the surface of the substrate. A product in which the substrate and the fiber film 13 are integrated can thus be obtained. Examples of a product in which a substrate and a fiber film 13 are integrated include a separator-integrated electrode used in a battery or an electrolysis capacitor, but are not limited thereto. In this case, either one of the negative electrode or the positive electrode of an electrode group may be used as the substrate. The film fiber 13 formed on the surface of the substrate serves as a separator integrated with a negative electrode or a positive electrode.

A high polymer contained in the material liquid, and a solvent for dissolving the high polymer are determined as appropriate in accordance with the type, etc. of fiber to be accumulated on the surface of a transfer target. A high polymer material is not limited to a specific type, and any type can be used as appropriate according to material properties of fiber to be formed. The examples of the high polymer material are: polypropylene, polyethylene, polystyrene, polyethylene terephthalate, polyvinyl chloride, polycarbonate, nylon, aramid, polyimide, and polyamide-imide etc. Any solvent used for a material liquid may be used as long as a high polymer material can dissolve into the solvent. The solvent can be changed as appropriate in accordance with a high-polymer material to dissolve. As the solvent, for example, water, ethanol, isopropyl alcohol, acetone, benzene, toluene, N-methyl-2-pyrrolidone (NMP), and dimethylacetamide (DMAc), etc. can be used.

The electric power supply 8 applies a voltage of a predetermined polarity to each spinning head 5. At this time, voltages of the same polarity are respectively applied to the plurality of spinning heads 5. In each spinning head 5, a voltage is applied by the electric power supply 8 as described above, and a material liquid is supplied from the supply unit 7; as a result, the material liquid is electrified in the same polarity as the voltage applied to the spinning head. The polarity of the voltage applied to the spinning heads 5 from the electric power supply 8 may be positive or negative. In other words, in each spinning head 5, a material liquid may be electrified in a positive polarity or a negative polarity. In the example shown in FIG. 2, etc., in each spinning head 5, the entire spinning head 5 is made of an electrically conductive material, and a voltage of a predetermined polarity is applied to the entirety of the spinning head 5. In each spinning head 5, the supplied material liquid is electrified in the same polarity as the applied voltage. In the example shown in FIG. 2, the electric power supply 8 is a direct current power supply, and a material liquid is electrified in a positive polarity in each spinning head 5.

In another example, only the nozzles 6 are made of an electrically conductive material, and the other parts of the spinning head 5 are made of a non-electrically conductive material. In each spinning head 5, a voltage of a predetermined polarity is applied to the nozzles 6, and the supplied material liquid is electrified in the same polarity as the nozzles 6. In another example, a conductive unit is provided in either a supply source of a material liquid to each spinning head 5 or a supply path for a material liquid between the supply source and each spinning head 5, and a voltage of a predetermined polarity is applied to the electrically conductive part by the electric power supply 8. A material liquid is electrified in the same polarity as the electrically conductive part to which a voltage has been applied. In this case, the material liquid electrified in a predetermined polarity is supplied to each spinning head 5.

In one example, a transfer target 10 transferred in the transfer unit 3 is grounded. In another example, instead of grounding a transfer target 10, a voltage of a polarity opposite to that of each spinning head 5 is applied to the transfer target 10 by either the electric power supply 8 or an electric power supply other than the electric power supply 8. In the present embodiment, as described above, a material liquid supplied to each spinning head 5 is electrified in a predetermined polarity through the application of a voltage by the electric power supply 8. For this reason, an electric potential difference occurs between the material liquid supplied to each spinning head 5 and the transfer target 10, and the electric potential difference causes the nozzles 6 of each spinning head 5 to eject the material liquid against the transfer target 10.

As described above, in the present embodiment, a material liquid is ejected from each spinning head 5 toward a transfer target 10 by an electrospinning method (sometimes called an "electric charge induction spinning method"), and a fiber film 13 is thereby formed on the surface of the transfer target 10. The amplitude of the voltage applied to the spinning heads 5, etc. by the electric power supply 8 is set as appropriate, in accordance with a type of a solvent and a solute of a material liquid, a boiling point and steam pressure curve of a solvent of the material liquid, a concentration and temperature of the material liquid, the shape of the nozzles 6, a distance between the transfer target 10 (the transfer unit 3) and the nozzle 6, and the like. The ejection speed of the material liquid from each nozzle 6 of the spinning head 5 corresponds to a concentration, a viscosity, and a temperature of the material liquid, a voltage applied to the spinning head 5, and the shape of the nozzle 6, and the like.

In the example of FIGS. 1 to 3, each of the spinning heads 5A ejects a material liquid from one side of the first direction (the depth direction of the transfer unit 3) toward the transfer target 10. Each spinning head 5B ejects a material liquid from the side opposite the spinning heads 5A in regard to the first direction toward the transfer target 10. For this reason, in the examples of FIGS. 1 to 3, the material liquid is ejected from both sides of the first direction toward the transfer target 10 transferred in the transfer unit 3. Thus, the material liquid is ejected on both surfaces of the transfer target 10, and the fiber film 13 is formed on both surfaces of the transfer target 10. In one example, the material liquid may be ejected only on one surface of the transfer target 10 transferred in the transfer unit 3. In this case, a fiber film 13 is formed only on one surface of the transfer target 10.

The electrospinning apparatus 1 includes an air ejection unit 15, an air suction unit 16, and a controlling unit (controller) 17. The air ejection unit 15 is arranged on one side of the second direction (the width direction of the transfer unit 3) with respect to the transfer unit 3. When operated, the air ejection unit 15 ejects air, for example dry air, toward the transfer unit 3. Thus, air is ejected by the air ejection unit 15 from one side of the second direction in the transfer unit 3. Ejecting air from the air ejection unit 15 as described above forms a flow of an air (arrow F1) across the transfer unit 3 toward an area located on the opposite side of the air ejection unit 15 across the transfer unit 3 in the second direction.

In the present embodiment, the air suction unit 16 is arranged on the opposite side of the air ejection unit 15 across the transfer unit 3 in regard to the second direction, and arranged in the area located on the opposite side of the air ejection unit 15 across the transfer unit 3 in the second direction. For this reason, the air suction unit 16 is arranged in an area toward which the air from the air ejection unit 15 flows across the transfer unit 3. When operated, the air suction unit 16 suctions the air flowing across the transfer unit 3 toward the area located on the opposite side of the air ejection unit 15 across the transfer unit 3 in regard to the second direction. In the example shown in FIG. 3, etc., the air suction unit 16 faces the air ejection unit 15 across the transfer unit 3 in the second direction (the width direction of the transfer unit 3).

In the present embodiment, the air suction unit 16 is operated, while the air ejection unit 15 is being operated. By operating the air ejection unit 15 and the air suction unit 16, the flow direction of the air (arrow F1) flowing across the transfer unit 3 to the area on the opposite side of the air ejection unit 15 across the transfer unit 3 is parallel, or approximately parallel, to the second direction. Herein, a virtual plane H orthogonal, or approximately orthogonal, to the transfer direction of the transfer unit 3 is defined. In the present embodiment, the flow direction of the air flowing across the transfer unit 3, which is formed by the operation of the air ejection unit 15 and the air suction unit 16 is parallel, or approximately parallel, to the virtual plane H, and the angle of the flow direction with respect to the virtual plane H is 0 degrees or approximately 0 degrees. In the example of FIG. 3, etc., the lower side of the vertical direction is the transfer direction in the transfer unit 3; therefore, the virtual plane H is a horizontal plane.

The controlling unit 17 is a computer, for example. The controlling unit 17 includes a processor or an integrated circuit (control circuit) including a CPU (central processing unit), an ASIC (application specific integrated circuit), or an FPGA (field programmable gate array), and a storage medium, such as a memory. The controlling unit 17 may include only one integrated circuit, etc., or a plurality of integrated circuits, etc. The controlling unit 17 performs processing by executing a program, etc. stored on the storage medium, etc. The controlling unit 17 controls the supply of a material liquid to each spinning head 5, the transfer of a transfer target 10, the application of a voltage from the electric power supply 8, the operations of the air ejection unit 15 and the air suction unit 16, and the like. The processing of the controlling unit 17 may be performed by a server in a cloud environment, instead of a computer. In this case, the processing of the controlling unit 17 is performed by executing a program stored in a cloud memory, etc., by a virtual processor, for example.

With a transfer target 10 being transferred in the transfer unit 3, the controlling unit 17 causes a material liquid to be supplied from the supply unit 7 to each spinning head 5, and causes the material liquid supplied to each spinning head 5 to be electrified by applying a voltage from the electric power supply 8. Thus, a material liquid is ejected from the first direction (the depth direction of the transfer unit 3) toward the transfer target 10, with the transfer target 10 being transferred in the transfer unit 3. With the material liquid being ejected toward the transfer target 10 in the transfer unit 3, the controlling unit 17 operates the air ejection unit 15, and causes the air ejection unit 15 to eject air from the one side of the second direction toward the transfer unit 3. Thus, with a material liquid being ejected toward a transfer target 10 in the transfer unit 3, a flow of the air across the transfer unit 3 is formed toward the area located on the opposite side of the air ejection unit 15 across the transfer unit 3 in the second direction.

In the present embodiment, the controlling unit 17 operates the air suction unit 16 in parallel to the operation of the air ejection unit 15. Thus, the air flowing across the transfer unit 3 toward the area on the opposite side of the air ejection unit 15, across the transfer unit 3 in the second direction, is suctioned by the air suction unit 16. In the present embodiment, the controlling unit 17 controls the operation of the air ejection unit 15 so as to adjust an amount and an ejection speed, etc. of air ejected from the air ejection unit 15. Furthermore, the controlling unit 17 controls the operation of the air suction unit 16 so as to adjust an amount and a suction speed, etc. of air suctioned by the air suction unit 16.

When a material liquid is ejected from each spinning head 5 toward a transfer target 10 transferred in the transfer unit 3, the vapor of a solvent contained in a material liquid forms in the area in which the material liquid is ejected. As shown in FIG. 1, etc., the electrospinning apparatus 1 of the present embodiment includes detectors 18. Each detector 18 detects a concentration of the vapor of the solvent contained in a material liquid. In the example of FIG. 1, etc., four detectors 18 are provided, and each detector 18 is arranged between two spinning head 5 which are adjacent to each other in the transfer direction in the transfer unit 3.

The number of detectors 18 is one or more, and the positions at which the detectors 18 are arranged are not limited as long as the detectors 18 are located in the transfer unit 3 or in the vicinity thereof. In other words, it suffices that one or more detectors 18 are provided in the area at which a material liquid is ejected from the spinning heads 5 or the vicinity thereof. The detectors 18 are arranged in positions at which the detectors 18 do not hinder the ejection of a material liquid from each spinning head 5 toward a transfer target 10. In one example, the detectors 18 are arranged in such a manner as to be adjacent to the most upstream spinning head 5 from the upstream side of the transfer unit 3. In another example, the detectors 18 are arranged so as to be adjacent to the spinning head 5 which is most downstream from the downstream side of the transfer unit 3. In yet another example, the detectors 18 are arranged between the air ejection unit 15 and the air suction unit 16 in the second direction (the width direction of the transfer unit 3), and the detectors 18 are adjacent to the transfer unit 3 from the one side of the second direction.

In the present embodiment, the processing apparatus 17 obtains the detection results of the detectors 18. The controlling unit 17 calculates a concertation in the area in which the material liquid is ejected from the spinning heads 5 for the vapor of the solvent contained in the material liquid, based on the detection results of the detectors 18. The controlling unit 17 adjusts an amount and an ejection speed of air ejected from the air ejection unit 15 based on the calculated vapor concentration. The controlling unit 17 may adjust an amount and a suction speed, etc. of suctioned air in the air suction unit 16 based on the calculated concentration of a solvent vapor. In one example, the controlling unit 17 determines whether or not a calculated concentration of a solvent vapor is greater than a reference value. If the concentration is greater than the reference value, the controlling unit 17 increases at least one of the amount or the ejection speed of air ejected from the air ejection unit 15 from a real-time state. At this time, at least one of the amount or the suction speed of air suctioned by the air suction unit 16 may be increased from a real-time state.

In the present embodiment, each spinning head 5 is capable of ejecting a material liquid from the first direction toward the transfer unit 3. The air ejection unit 15 ejects air from one side of the second direction toward the transfer unit 3 to form a flow of the air across the transfer unit 3 toward the area located on the opposite side (the other side) of the air ejection unit 15 across the transfer unit 3 in the second direction. When a material liquid is being ejected from each spinning head 5 toward a transfer target 10 in the transfer unit 3, due to the flow of air being formed in the above-described manner, the vapor of a solvent contained in the material liquid flows together with the air from the air ejection unit toward the area on the opposite side of the air ejection unit 15 across the transfer unit 3. Thus, the transfer unit 3 and the vicinity thereof, in other words, the area in which a material liquid is ejected from the spinning heads 5, can be ventilated as appropriate, and the vapor concentration of the solvent of the material liquid appropriately declines in the area in which the material liquid is ejected from the spinning heads 5.

As the vapor concentration of the solvent appropriately declines in the area in which the material liquid is ejected from the spinning heads 5, droplets of the solvent contained in the material liquid become more difficulty remaining on the surface of the transfer target 10. This difficulty in turn ensures the formation of solvent droplets in the fiber film 13 on the surface of the transfer target 10 can be appropriately suppressed even when an amount of the material liquid ejected from each spinning head 5 is increased. Therefore, even if an amount of the material liquid ejected from each spinning head 5 is increased, the fiber film 13 in which solvent droplets are either substantially or entirely absent can be appropriately formed on the surface of the transfer target 10.

In the present embodiment, the air suction unit 16 suctions the air flowing across the transfer unit 3 toward the area on the opposite side of the air ejection unit 15 across the transfer unit 3 in regard to the second direction. The air suction unit 16 is arranged in an area on the opposite side of the air ejection unit 15 across the transfer unit 3 in the second direction. Thus, a flow of the air across the transfer unit 3 in the second direction can be more appropriately formed. Thus, the area in which a material liquid is ejected from the spinning heads 5 can be further ventilated as appropriate, and the vapor concentration of the solvent of the material liquid appropriately declines in the area in which the material liquid is ejected from the spinning heads 5.

In the present embodiment, the detectors 18 detect a vapor concentration of a solvent contained in the material liquid. The controlling unit 17 calculates a concertation in the area in which the material liquid is ejected from the spinning heads 5 for the vapor of the solvent contained in the material liquid based on the detection results of the detectors 18. The controlling unit 17 adjusts an amount and the ejection speed of the air ejected from the air ejection unit 15 and/or an amount and the suction speed, etc. of the air suctioned by the air suction unit 16. based on the calculated concentration of the solvent vapor. It is thus possible to adjust the amount and speed of the air flowing across the transfer unit 3 as appropriate in accordance with the concentration of the solvent vapor in the area in which the material liquid is ejected. Thus, the area in which a material liquid is ejected from the spinning heads 5 can be further ventilated as appropriate, and the vapor concentration of the solvent of the material liquid appropriately declines in the area in which the material liquid is ejected from the spinning heads 5.

(Modifications)

Figure 4:
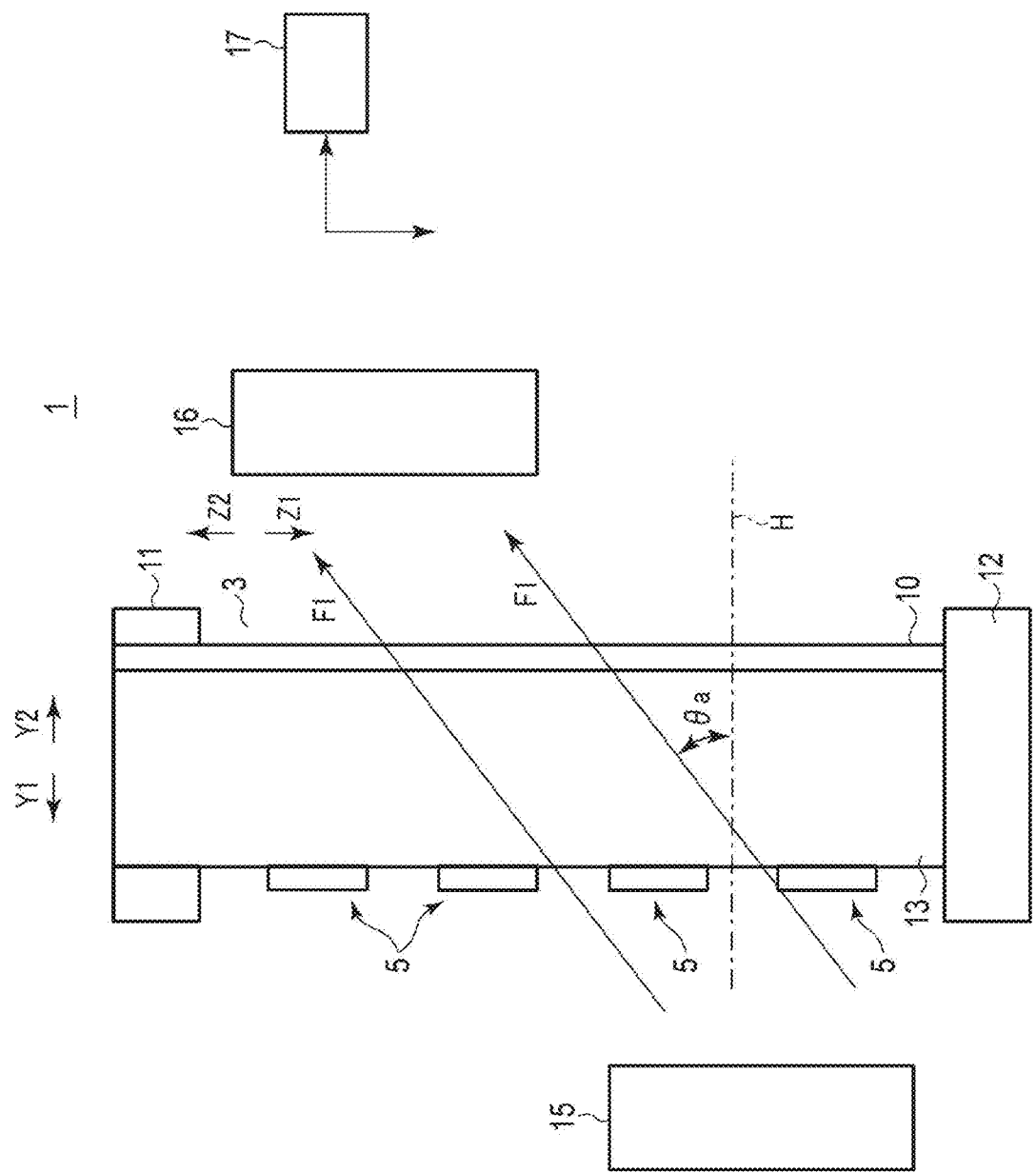
FIG. 4 is a schematic diagram showing an electrospinning apparatus of a first modification, when a transfer unit, etc. are viewed from one side of a first direction.
Figure 5:
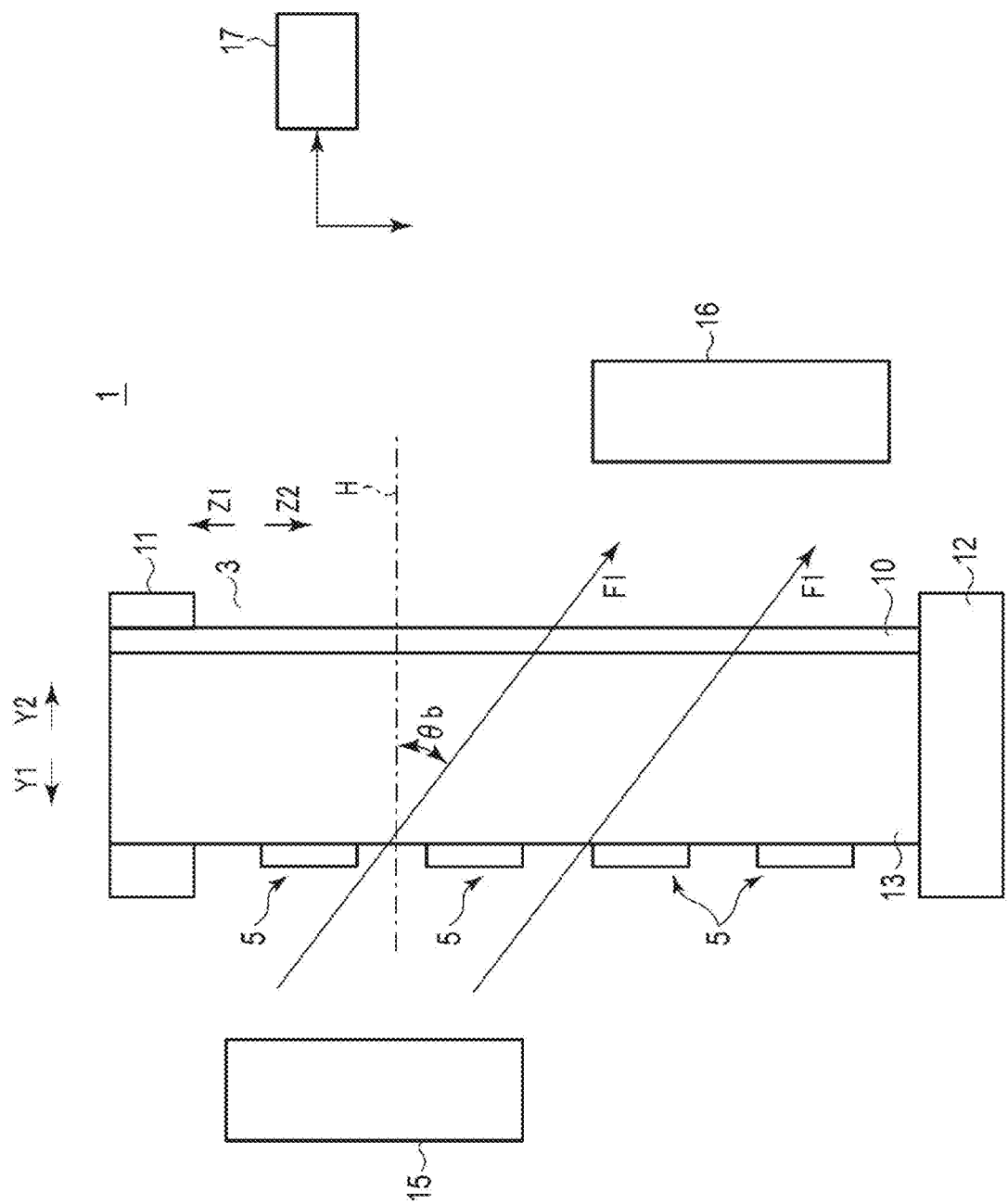
FIG. 5 is a schematic diagram showing an electrospinning apparatus of a second modification, when a transfer unit, etc. are viewed from one side of a first direction.

In the foregoing embodiment, the flow direction of the air flowing across the transfer unit 3 in the second direction (the width direction of the transfer unit 3) is parallel, or appropriately parallel, to the virtual plane H; however, the flow direction is not limited to this example. In the first modification shown in FIG. 4, the flow direction of the air flowing across the transfer unit 3 in the second direction is tilted on the upper stream side of the transfer unit 3 with respect to the virtual plane H. In the second modification shown in FIG. 5, the flow direction of the air flowing across the transfer unit 3 in the second direction is tilted on the lower stream side of the transfer unit 3 with respect to the virtual plane H. FIGS. 4 and 5 show the transfer unit 3, etc. viewed from one side of the first direction.

In each of the first and second modifications, similar to the foregoing embodiment, etc., the air ejection unit 15 ejects air from one side of the second direction toward the transfer unit 3 to form a flow of the air across the transfer unit 3 toward the area located on the opposite side of the air ejection unit 15 across the transfer unit 3 in the second direction. For this reason, in any of the modifications, similar to the foregoing embodiment, etc., the transfer unit 3 and the vicinity thereof, in other words, the area in which the material liquid is ejected from the spinning heads 5, is appropriately ventilated, and the concentration of vapor of the material liquid appropriately declines in the area in which the material liquid is ejected from the spinning heads 5. Accordingly, the operations and advantageous effects similar to those of the foregoing embodiment, etc. are achieved in the modifications.

Herein, the angle of tilt θa, which is a tilt of the flow direction across the transfer unit 3 and inclined on the upstream side of the transfer unit 3 with respect to the virtual plane H, is defined in the first modification of FIG. 4. The tilt angle θa is 60 degrees or smaller. In the example of FIG. 4, the lower side of the vertical direction is the transfer direction in the transfer unit 3. For this reason, in the example of FIG. 4, the tilt angle θa corresponds to an elevation, which is a tilt angle on the upper side of the vertical direction with respect to the horizontal plane. The tilt angle θb, which is a tilt of the flow direction across the transfer unit 3 and inclined on the downstream side of the transfer unit 3 with respect to the virtual plane H, is defined in the second modification of FIG. 5. The tilt angle θb is 60 degrees or smaller. In the example of FIG. 5, the lower side of the vertical direction is the transfer direction in the transfer unit 3. For this reason, in the example of FIG. 5, the tilt angle θb corresponds to a depression, which is a tilt angle on the lower side of the vertical direction with respect to the horizontal plane.

Figure 6:
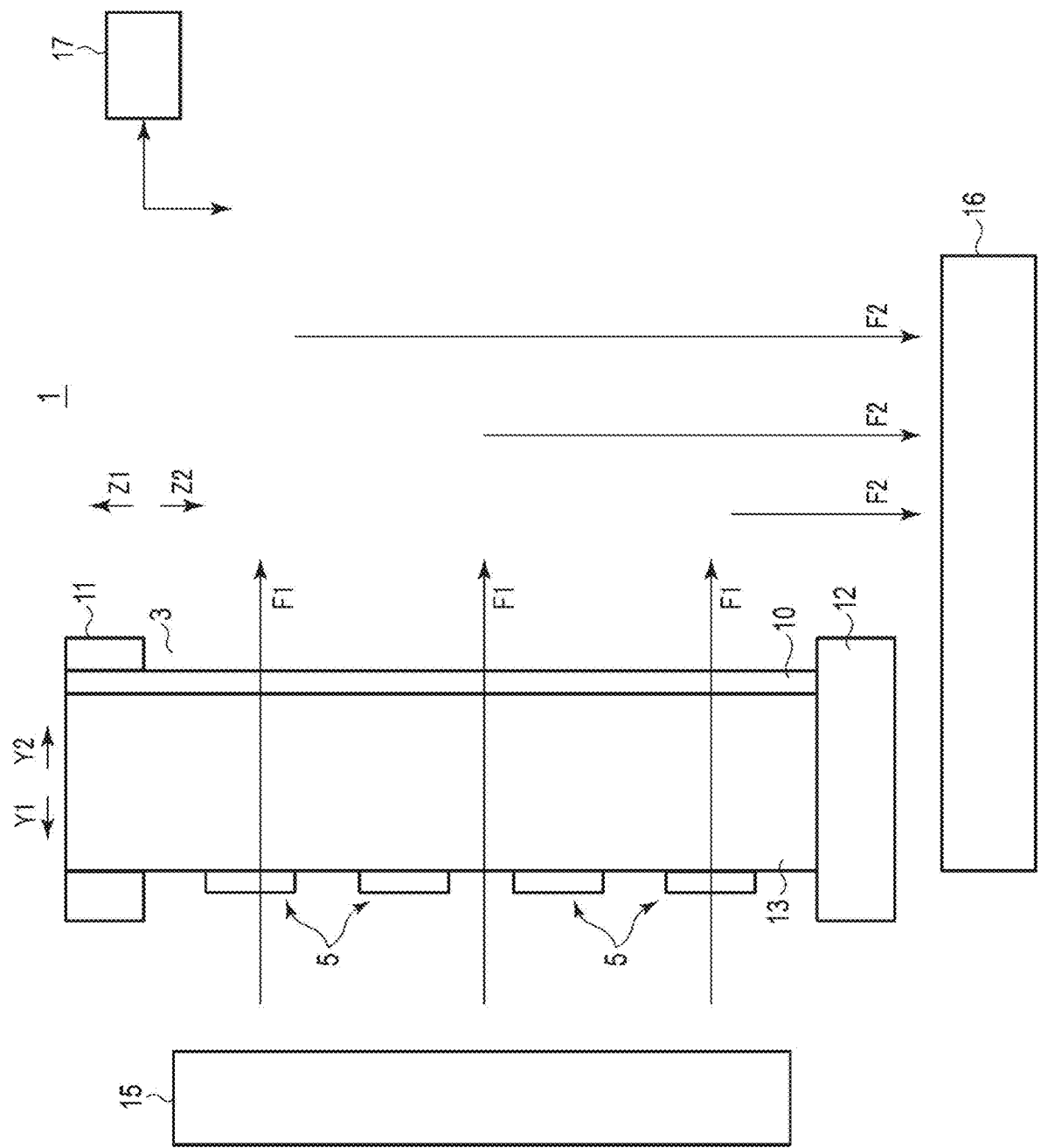
FIG. 6 is a schematic diagram showing an electrospinning apparatus of a third modification, when a transfer unit, etc. are viewed from one side of a first direction.

In the foregoing embodiment, etc., the air suction unit 16 is arranged in the area on the opposite side of the air ejection unit 15 across the transfer unit 3 in the second direction; however, the position of the air suction unit 16 is not limited to this example. In the third modification shown in FIG. 6, a transfer target 10 is transferred toward the lower side of the vertical direction in the transfer unit 3, and the air suction unit 16 is arranged in a position further away from the transfer unit 3 toward the lower side of the vertical direction. In other words, the air suction unit 16 is arranged in a position further away from the transfer unit 3 in the direction intersecting both the first and second directions.

Even in this modification, the air ejection unit 15 ejects air from one side of the second direction toward the transfer unit 3, and forms a flow of air (arrow F1) across the transfer unit 3 toward the area located on the opposite side of the air ejection unit 15 across the transfer unit 3 in regard to the second direction. In the present modification, the air passing across the transfer unit 3 in the second direction flows from the area on the opposite side of the air ejection unit 15 across the transfer unit 3 in the second direction toward the lower side of the vertical direction (as indicated by arrow F2), by operation of the air suction unit 16 in parallel to the operation of the air ejection unit 15. In other words, the air flows from the area on the opposite side of the air ejection unit 15 across the transfer unit 3 in the second direction toward the air suction unit 16, and along the direction intersecting both the first and second directions.

In the present modification, similar to the foregoing embodiment, etc., the flow of the air across the transfer unit 3 toward the area located on the opposite side of the air ejection unit 15 across the transfer unit 3 in the second direction is formed. For this reason, in the present modification, similar to the forgoing embodiment, etc., the transfer unit 3 and the vicinity thereof, in other words, the area in which the material liquid is ejected from the spinning heads 5, is appropriately ventilated, and the vapor concentration of the material liquid appropriately declines in the area in which the material liquid is ejected from the spinning heads 5. Accordingly, the operations and advantageous effects similar to those of the foregoing embodiment, etc. are achieved in the present modification.

In an electrospinning apparatus 1 of an example, a transfer unit in which a transfer target 10 is transferred toward the lower side of the vertical direction, like the transfer unit 3 of the example shown in FIGS. 1 to 3, and a transfer unit which transfers a transfer target 10 in the upper side of the vertical direction, which is opposite to the direction in the transfer unit 3 of the example shown in FIGS. 1 to 3, are arranged alternately in the transfer path 2. In the transfer unit in which the transfer direction is the lower side of the vertical direction and the transfer unit in which the transfer direction is the upper side of the vertical direction, similar to the foregoing embodiment, etc., one or more spinning heads 5 eject a material liquid from a first direction (depth direction of the transfer unit) intersecting (orthogonal or approximately orthogonal to) the transfer direction toward a transfer target 10.

In each of the transfer units, similar to the foregoing embodiment, etc., dry air is ejected by the air ejection unit 15 from one side of a second direction (width direction of the transfer unit) intersecting (orthogonal or approximately orthogonal to) both a transfer direction and a first direction toward the transfer unit. Thus, in each of the transfer units, a flow of the air across the transfer unit is formed toward the area located on the opposite side of the air ejection unit 15 across the transfer unit in the second direction. Thus, in the electrospinning apparatus 1, each of the transfer units and the vicinity thereof are ventilated as appropriate, similar to the foregoing embodiment, etc. In each of the transfer units and the vicinity thereof, the concentration of a solvent vapor of a material liquid declines as appropriate, similar to the foregoing embodiment, etc.

According to at least one of the foregoing embodiments or modifications, a spinning head is capable of ejecting a material liquid from a first direction intersecting a transfer direction toward a transfer unit. By ejecting air against the transfer unit from one side of a second direction, an air ejection unit forms an air flow across the transfer unit toward an area located on the opposite side across the transfer unit in the second direction, which intersects both a transfer direction and a first direction. It is possible to provide an electrospinning apparatus and an electrospinning method with which a vapor concentration of a solvent contained in a material liquid can be lowered in an area in which the material liquid is ejected from spinning heads.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrospinning apparatus comprising:
   a transfer unit in which a transfer target is transferred along a transfer direction;
   a spinning head capable of ejecting a material liquid toward the transfer unit from a first direction intersecting the transfer direction in the transfer unit;
   an air ejection unit that ejects air toward the transfer unit from one side of a second direction intersecting both the transfer direction and the first direction to form a flow of the air across the transfer unit toward an area located on an opposite side across the transfer unit in the second direction; and a detector that detects a vapor concentration of a solvent contained in the material liquid, wherein in an area in which air is ejected from the air ejection unit toward the transfer unit, the detector is arranged in each of an upper stream side portion and a lower stream side portion.

2. The electrospinning apparatus according to claim 1, further comprising:

an air suction unit that suctions the air flowing across the transfer unit toward the area located on the opposite side of the air ejection unit across the transfer unit in the second direction.

3. The electrospinning apparatus according to claim 2, wherein the air suction unit is arranged in the area on the opposite side of the air ejection unit across the transfer unit in the second direction.

4. An electrospinning method comprising:

transferring a transfer target along a transfer direction in a transfer unit;

ejecting a material liquid from a first direction intersecting the transfer direction in the transfer unit toward the transfer target transferred in the transfer unit; and ejecting air toward the transfer unit from one side of a second direction intersecting both the transfer direction and the first direction, while the material liquid being ejected toward the transfer target, so as to form a flow of the air across the transfer unit toward an area located on an opposite side across the transfer unit in the second direction; and detecting a vapor concentration of a solvent contained in the material liquid, wherein in an area in which air is ejected from the ejecting air toward the transfer unit, the detecting is performed in each of an upper stream side portion and a lower stream side portion.

* * * * *